No. 695,143. Patented Mar. 11, 1902.
T. BRUGER.
ELECTRIC METER.
(Application filed Nov. 29, 1901.)

(No Model.)

Witnesses

Inventor
Theodor Bruger
by Fisher & Freeman,
Attorneys.

UNITED STATES PATENT OFFICE.

THEODOR BRUGER, OF FRANKFORT-ON-THE-MAIN, GERMANY, ASSIGNOR TO HARTMANN & BRAUN, ACTIENGESELLSCHAFT, OF FRANKFORT-ON-THE-MAIN, GERMANY, A FIRM.

ELECTRIC METER.

SPECIFICATION forming part of Letters Patent No. 695,143, dated March 11, 1902.

Application filed November 29, 1901. Serial No. 84,075. (No model.)

*To all whom it may concern:*

Be it known that I, THEODOR BRUGER, a subject of the Emperor of Germany, and a resident of Frankfort-on-the-Main, Germany, (whose postal address is 9 Koenigstrasse, Frankfort-on-the-Main, Bockenheim,) have invented certain new and useful Improvements in Electric Meters, of which the following is a specification.

In electric meters the supply of the current to the rotating armature presents a great difficulty, and owing to the unavoidable friction of the meter faulty indications are caused, especially when the load is light. The hereinafter-described arrangement of the rotating armature for this class of meters renders it possible to reduce the objectionable friction of the rubbing contacts, inasmuch as this arrangement requires only one rubbing contact on the collector.

Figure 1:
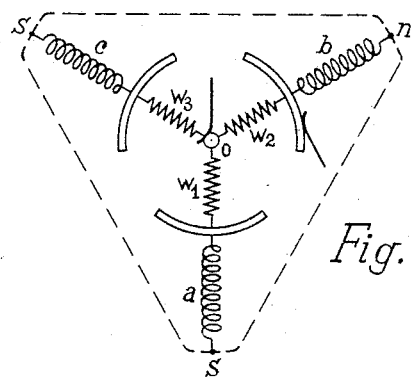
Figure 2:
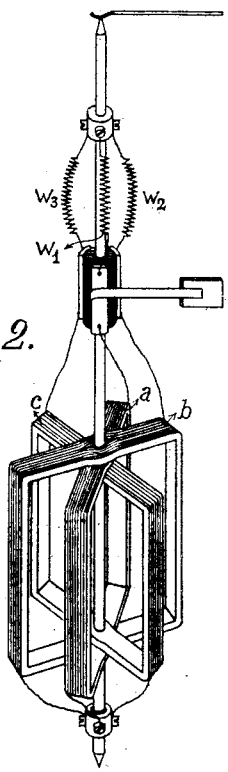

Figure 1 is a diagrammatic plan, and Fig. 2 a perspective view, illustrating the instrument according to this invention.

According to this invention the armature consists of three active coils $a\ b\ c$, arranged at one hundred and twenty degrees from each other, and of three resistances $w'\ w^2\ w^3$ in advance of the active coils, there being one additional resistance to each coil. Between each resistance and the coil is arranged the corresponding collector-segment, the three free ends of the coils being connected with each other and those of the said resistances being also connected with each other. The current arrives always at the common point of connection of the three resistances, while the current is taken by one of the three segments of the collector through a rubbing contact. The active coils are so wound that their windings run in the same direction from the collector, and they are traversed by the current in such a manner that two of them are of the same polarity, while the third is of the opposite polarity. For a given current and a given number of windings the active number of ampere-turns increases as the resistance of the aforesaid resistance-coils $w'\ w^2\ w^3$ increases in proportion to that of the aforesaid active coils $a\ b\ c$. However, with resistance-coils which are ten times the resistances of the active coils the maximum is nearly reached.

The mechanical arrangement of the armature is preferably so contrived that the common point in which the three resistance-coils are united is at the upper end of the axis of rotation of the apparatus, the said upper end being there provided with a point of platinum, on which bears lightly a spring-plate, through which the current enters the apparatus, Fig. 2. A connection similar to the one hereinbefore described may also be provided on armatures having more than three active coils; but in this case it is necessary that the rubbing contact should bear simultaneously on several collector-segments. Thus in case of four or five coils the rubbing contact would bear on two segments.

Having now particularly described and ascertained the nature of my invention and in what manner the same is to be performed, I declare that what I claim is—

1. An electric meter, comprising a plurality of conducting systems connected in parallel, each system including an active coil and a resistance connected by a collector-segment arranged between the resistances and active coils, the resistances being connected at a common point, with means for supplying current at said common point of connection, substantially as described.

2. An electric meter, comprising a plurality of conducting systems connected in parallel, each system including an active coil and a resistance with a collector-segment between the same to which they are connected, said resistances being connected at a common point, with means for supplying current at such point, and the active coils being connected to each other, with means for withdrawing current from the collector-segments, substantially as described.

In testimony whereof I have signed my name to this specification in the presence of two subscribing witnesses.

THEODOR BRUGER.

Witnesses:
 JEAN GRUND,
 CARL GRUND.